No. 812,842. PATENTED FEB. 20, 1906.
E. E. GOOD.
MILKING APPARATUS.
APPLICATION FILED JUNE 10, 1905.
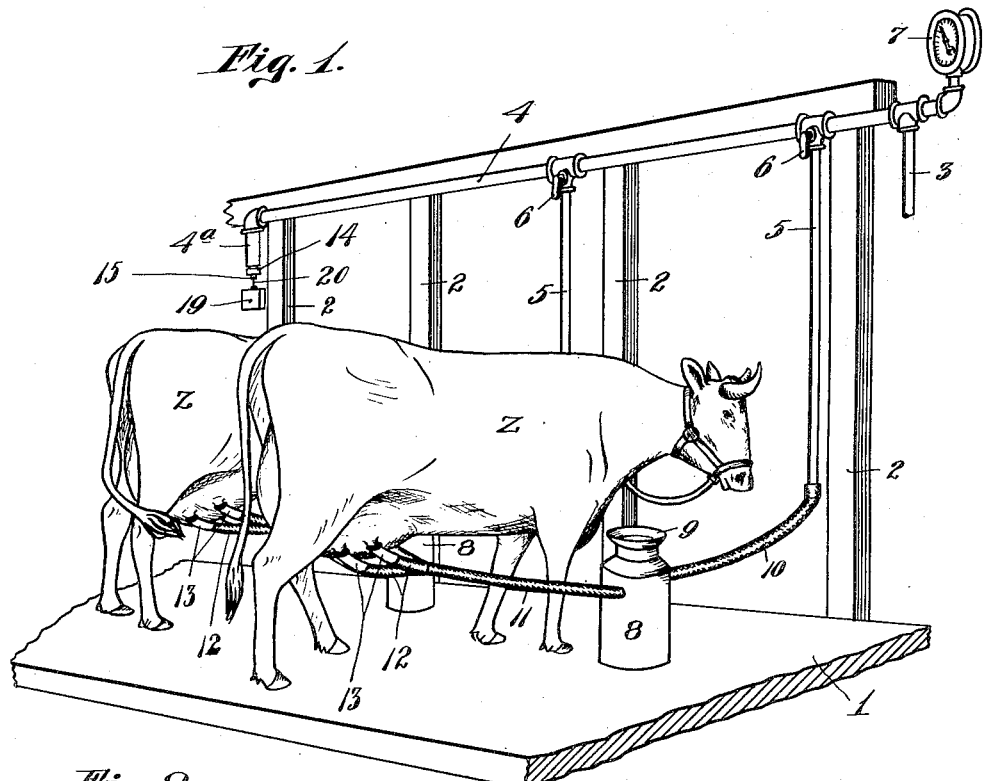
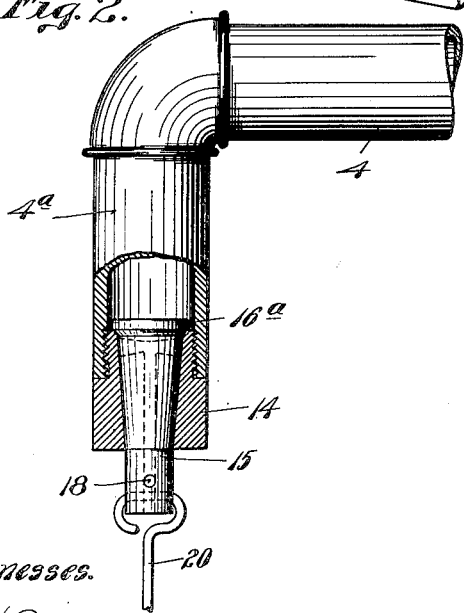
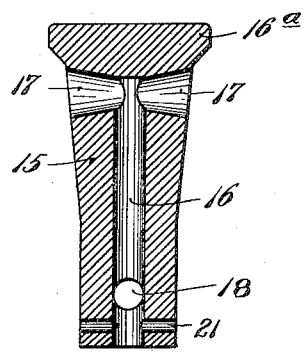
Witnesses.
E. W. Jeppesen.
A. H. Opsahl.
Inventor.
Ezra E. Good.
By his Attorneys.
Williamson & Merchant

UNITED STATES PATENT OFFICE.

EZRA E. GOOD, OF WATERLOO, IOWA, ASSIGNOR TO THE SANITARY COW MILKING COMPANY, OF MINNEAPOLIS, MINNESOTA, A CORPORATION OF IOWA.

MILKING APPARATUS.

No. 812,842.        Specification of Letters Patent.        Patented Feb. 20, 1906.

Application filed June 10, 1905. Serial No. 264,574.

*To all whom it may concern:*

Be it known that I, EZRA E. GOOD, a citizen of the United States, residing at Waterloo, in the county of Blackhawk and State of Iowa, have invented certain new and useful Improvements in Milking Apparatus; and I do hereby declare the following to be a full, clear, and exact description of the invention, such as will enable others skilled in the art to which it appertains to make and use the same.

My invention relates to a cow-milking apparatus of the character wherein milk is drawn from the cow through tubes and by the action of suction or partial vacuum produced in said tubes by an air-pump.

My invention has for its object to provide an improved device for producing pulsations or variations in the suction or partial vacuum whereby a milking action is produced which is more nearly like that produced by the hands in the ordinary milking action, thereby greatly increasing the efficiency of the apparatus and, further, producing an action which is more agreeable to the cow.

In the accompanying drawings, which illustrate my invention, like characters indicate like parts throughout the several views.

Figure 1 is a perspective view illustrating my invention incorporated in an apparatus attached to the stalls of a barn and applied to several cows. Fig. 2 is a view, partly in elevation and partly in vertical section, illustrating, on a larger scale than in Fig. 1, the improved valve mechanism by means of which the pulsating action is produced; and Fig. 3 is a vertical section taken through the valve and showing the same on a larger scale than in Fig. 2.

The numeral 1 indicates the floor, and the numeral 2 the stall-posts rigidly secured in the usual or any suitable way.

The character *z* indicates the cows within the stalls and which are being milked by the improved apparatus.

The numeral 3 indicates an air-pipe which leads to an air-pump, (not shown,) but by means of which the partial vacuum is produced in the various tubes and pipes of the milking apparatus. At one end the pipe 3 leads from a horizontally-extended pipe 4, having depending branches 5, of which branches there is one for each stall. In the upper ends of the branch pipes 5 are valves 6, by means of which the branch pipes may independently open and close at will.

The numeral 7 indicates a vacuum-gage which is in communication with the pipe 4.

The numeral 8 indicates a milk-can which is provided with a removable cover 9 of the usual or any suitable construction which will make the can approximately air-tight. One of these cans 8 is connected to each of the branch pipes 5, preferably by means of a flexible hose or air-tube 10, that opens into the upper portion of said can. Another flexible tube or hose section 11 opens into the upper portion of said can 8, and this tube in the apparatus illustrated is provided at its outer end with branch tubes 12 and teat-cups 13 of the construction and arrangement set forth and claimed in the patent to Joseph H. Hoover, No. 798,608, of September 5, 1905, and entitled "Milking Apparatus."

The device for producing the pulsations in the vacuum or suction pipes or tubes of the apparatus is preferably located at that end of the pipe 4 which is most distant from the pump connecting pipe 3, and, as shown, the said pipe 4 at said end is provided with a downturned section $4^a$, in the lower end of which is a removable plug 14. This plug 14 affords a valve-seat and is provided with a tapered perforation that fits a tapered vertically-disposed valve 15. This valve 15 is provided with an axial port 16, that opens at the lower end thereof, but terminates short of the upper end thereof, the upper end of said valve being preferably enlarged slightly, as shown at $16^a$. The upper end of the port 16 communicates with radial-extended and outwardly-flaring ports 17, that are closed when the valve is in a seated position. At its lower end the port 16 is provided with radial ports 18, that are always open to the atmosphere. A weight 19 is attached to the valve 15 by means of a rod 20, which rod, as shown, is hooked through a perforation 21 in the lower end of said valve.

The force of the weight 19 on the valve 15 should be such that the said valve will be opened up whenever the pressure within the air-tubes is reduced to about one-half atmospheric pressure. In practice I have found that with this arrangement the valve when it opens up will under its own momentum and that of the weight 19 be caused to jump and open up to a very considerable extent, so that before it again closes under the action of gravity the pressure in the air-tubes will be increased by the supply of air admitted through the ports or valve until the said pressure reaches approximately three-fourths of the atmospheric pressure. The valve will of course then remain closed until it is again opened by the reduction of pressure in the air-tubes to one-half an atmosphere.

When the valve opens up, a large supply of air is afforded through the axial port 16 and radial ports 17 and 18, and air will also be admitted between said valve and its tapered seat in the plug 14. When the valve is closed, the ports 16, 17, and 18 will of course be filled with air, so that the air has but a short distance to travel from the outer extremities of the port 17 into the depending section 4$^a$ of the air-pipe 4. The tapered form of the port 17 also facilitates a rapid supply of air.

A spring-seated valve would not be the equivalent of a weighted valve, because a spring would tend to close the valve instantly upon the least increase of pressure within the pipes and tubes of the apparatus, whereas (as already pointed out) the weighted valve acquires sufficient momentum to insure a good opening of the valve.

The device above described is extremely simple and of small cost. It has been put into actual use in an apparatus such as that illustrated in the drawings and has been found extremely efficient for the purposes had in view.

What I claim, and desire to secure by Letters Patent of the United States, is as follows:

1. In a milking apparatus, a device for producing pulsations comprising a weighted, normally seated valve, having an axial port and radial branch ports, which branch ports are normally closed, but which ports are in constant communication with the atmosphere, substantially as described.

2. In a milking apparatus, the combination with one of the air-pipes having a depending section 4$^a$, of a plug 14 in the lower end of said section 4$^a$, a weighted valve 15 having a tapered seat in said plug 14, said valve having the axial port 16 and flaring radial port 17, which ports 17 are normally closed and which ports 16 and 17 are in constant communication with the atmosphere, substantially as described.

In testimony whereof I affix my signature in presence of two witnesses.

EZRA E. GOOD.

Witnesses:
H. D. KILGORE,
F. D. MERCHANT.